(No Model.)
J. SCHAFHAUS.
BEER FININGS SPREADER.
No. 292,590. Patented Jan. 29, 1884.
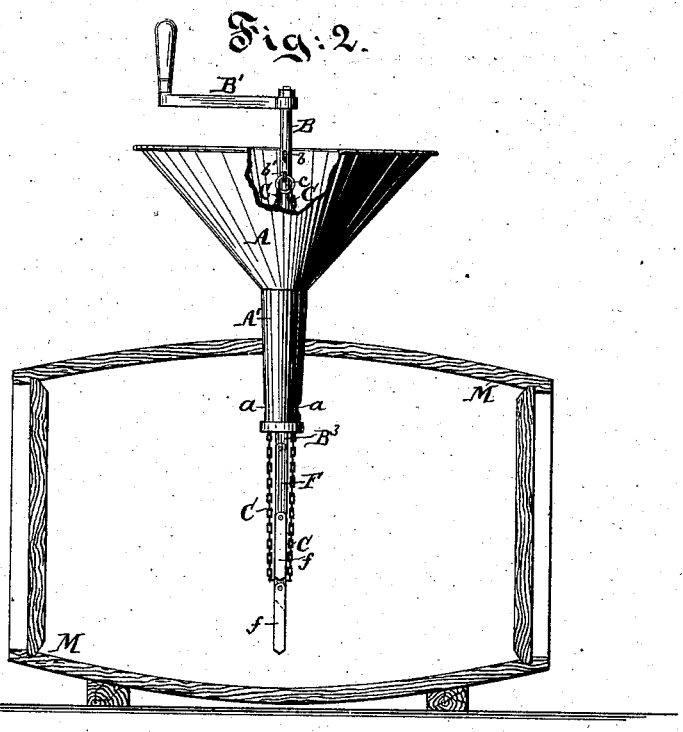
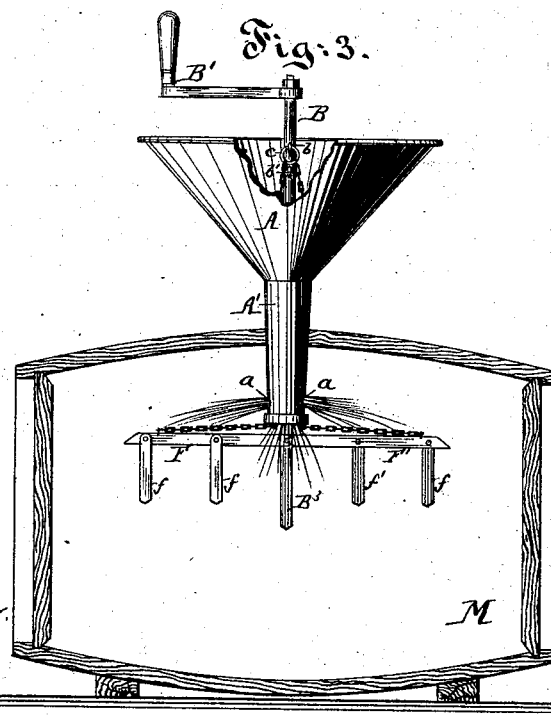
Witnesses:
J. L. Brown
G. F. Roll
Inventor:
Jean Schafhaus
by Adam E. Schatz
Atty

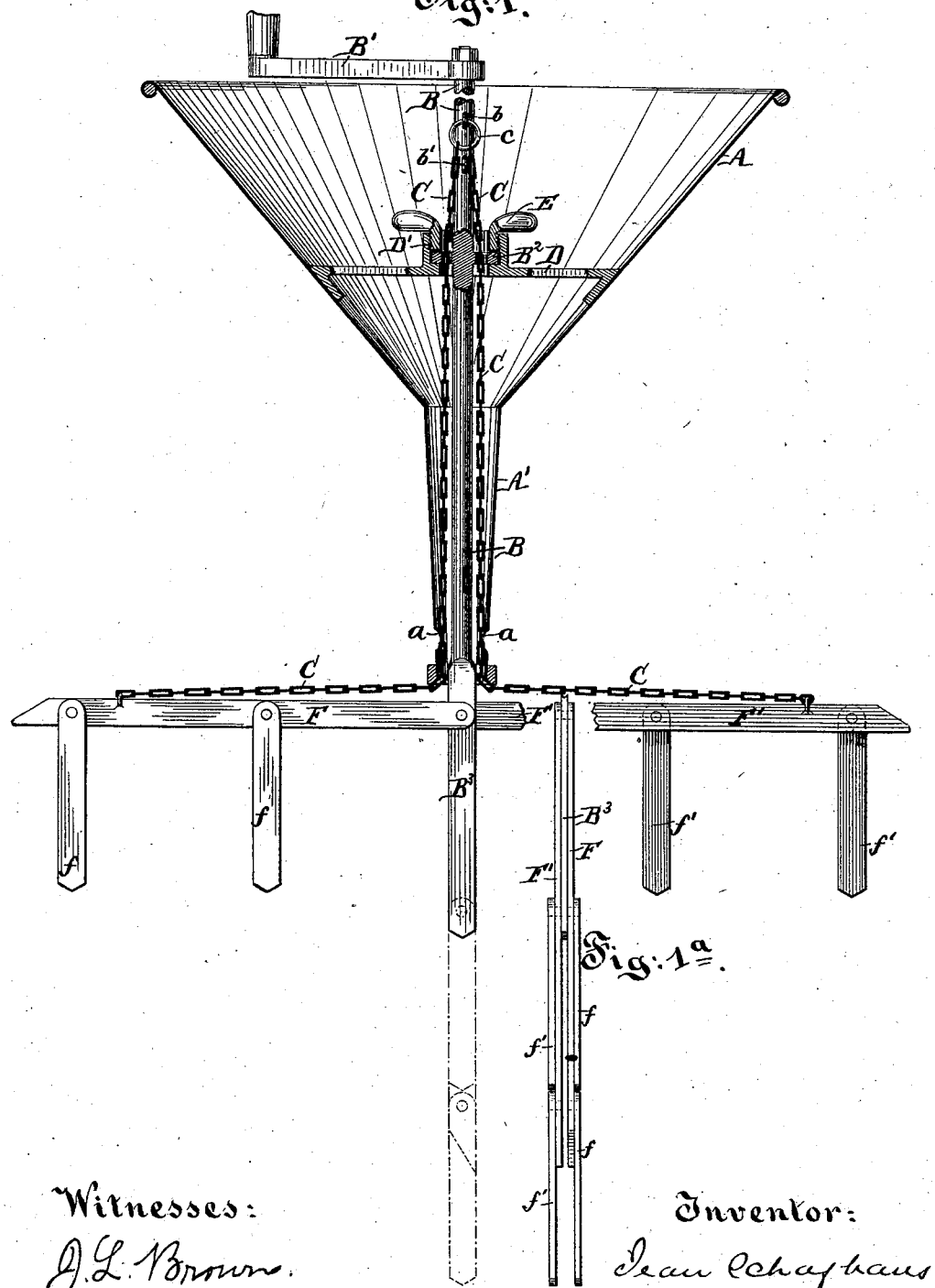

UNITED STATES PATENT OFFICE.

JEAN SCHAFHAUS, OF NEW YORK, N. Y.

BEER-FININGS SPREADER.

SPECIFICATION forming part of Letters Patent No. 292,590, dated January 29, 1884.

Application filed September 5, 1883. (No model.)

*To all whom it may concern:*

Be it known that I, JEAN SCHAFHAUS, a citizen of the United States, residing at New York, in the county of New York and State of New York, have invented certain new and useful Improvements in Beer-Finings Spreaders; and I do hereby declare the following to be a full, clear, and exact description of the invention, such as will enable others skilled in the art to which it appertains to make and use the same.

My invention relates to apparatus for distributing equally over the surface of beer in the course of manufacture, and while in the fermenting-casks, the clarifying medium, (dissolved isinglass.) The method heretofore employed was as follows: After the isinglass had been thoroughly dissolved, the proper quantity was poured into the cask, the cask being known as "shavings-cask," containing beer in a stage of manufacture that is known as "krausen stage"—that is, beer which is about to be racked or packed for consumption—has added a quantity of krausen or young beer, for the purpose of causing a generation of carbonic-acid gas to produce effervescence. By reason of this generation of gas, the beer becomes cloudy, the particles of yeast, &c., being carried upward by the rising gas. It is when beer is in this stage of its manufacture that my method and mechanism come into play. Heretofore when it became necessary to add the isinglass, it was poured into the cask at the bung-hole, and then a stick was inserted through the bung-hole for the purpose of distributing the isinglass in an equally-thick layer over the surface of the beer. This operation has to be performed very quickly and thoroughly, to prevent the isinglass from curdling or lumping. The process of clarifying is one of the most delicate encountered in the manufacture or brewing of beer. It is absolutely necessary to distribute the isinglass over the surface of the beer in a throughout equally-thick film, or layer, or sheet. The specific gravity of the isinglass being greater than that of the beer, the isinglass gradually sinks to the bottom, carrying with it all impurities or suspended particles. It is obvious, therefore, that to allow the isinglass to fall in all parts at the same time, it must have been equally distributed. This desirable result I obtain by my apparatus, which I will now describe.

In the drawings, Figure 1 represents a cross-section of my mechanism. Fig. 1ª represents the arms or spreaders folded. Fig. 2 represents the mechanism inserted in the fermenting-cask, with a section cut away, showing the engagement of the chain-ring with the hooks on the shaft B, the arms or spreaders being in their normal position. Fig. 3 is the same view, showing the arms or spreaders in position for operation.

Like letters represent like parts.

A represents the main body of the funnel; A', the lower part thereof. This lower part has the lateral holes $a$, which are provided for the purpose of allowing the escape of the liquid fining over the spreaders or arms F F', with their pendants $f f f' f'$. On the interior of the main body I provide a bridge, D, for the support of the shaft B, the bridge D, with the cylindrical threaded portion D'. The follower E is provided to prevent the shaft from rising out of place. B is the shaft, having the crank B', the flange $B^2$, and the lower flattened end, $B^3$. The hooks $b\ b'$ are provided to receive the ring $c$, that carries the chains C C'. To the lower end of the shaft I fasten in a suitable manner spreaders or arms F F'. To these arms I affix the pendants $f f f' f'$. Any suitable number may be used, but I prefer to affix four. The chains C C' are provided for the purpose of spreading the arms F F' after the mechanism has been set in the bung-hole of the cask M. The chains C C' are fastened at one end to the ring $c$, and at the other near the extremities of the arms F F'. The shaft with its parts having been passed through the funnel-neck A', the same rests by means of the the flange $B^2$. The follower E is then screwed in place to retain the shaft B. The whole mechanism is then set into the bung-hole of the barrel M. The chains are then drawn up, and the ring $c$ is set upon the upper hook on the shaft B. By this means the arms or spreaders F F' are raised, and the pendants $f f f' f'$ drop. The isinglass is then poured into the funnel, and the shaft B, with its parts, revolved by means of the crank. The isinglass is prevented, to a great extent, from escaping at the lower end, the turning of the shaft with its parts almost filling the mouth. Thus the isinglass escapes at the lateral holes and runs over the arms F F'. The arms in their spread position being revolved rapidly, the isinglass is very effectually and evenly spread over the surface of the beer.

Having described my invention, what I claim as new, and desire to secure by Letters Patent, is—

1. In a finings-spreader, the funnel A, having the main body, the neck A', said neck having the lateral holes $a\ a$, and the bridge D, said bridge being provided with the cylindrical threaded portion D'.

2. In a finings-spreader, the combination of the funnel A, having the neck A', with lateral holes $a\ a$, the bridge D, having the cylindrical threaded portion D', with the shaft B, said shaft being provided with the crank B', the flange B², the lower flattened portion, B³, and having affixed the arms or spreaders F F', said arms having the pendants $f f' f'$, the chains C' C, the ring $e$, and the follower E, constructed and operated substantially as described.

In testimony whereof I affix my signature in presence of two witnesses.

JEAN SCHAFHAUS.

Witnesses:
JOSEPH STRACKE,
WILLIAM I. LEE.